United States Patent
Fore et al.

(10) Patent No.: US 9,940,196 B2
(45) Date of Patent: Apr. 10, 2018

(54) METHODS AND SYSTEMS FOR OFFLOADING RAID PARITY RECONSTRUCTION

(71) Applicant: NETAPP, INC., Sunnyvale, CA (US)

(72) Inventors: Richard Christopher Fore, Apex, NC (US); Atul Goel, San Jose, CA (US); Stephen H. Strange, Mountain View, CA (US); Kyle Sterling, San Francisco, CA (US)

(73) Assignee: NETAPP, INC., Sunnyvale, CA (US)

( * ) Notice: Subject to any disclaimer, the term of this patent is extended or adjusted under 35 U.S.C. 154(b) by 152 days.

(21) Appl. No.: 15/135,265

(22) Filed: Apr. 21, 2016

(65) Prior Publication Data

US 2017/0308435 A1    Oct. 26, 2017

(51) Int. Cl.
*G06F 11/00* (2006.01)
*G06F 11/10* (2006.01)
*G06F 3/06* (2006.01)

(52) U.S. Cl.
CPC .......... *G06F 11/1088* (2013.01); *G06F 3/064* (2013.01); *G06F 3/0619* (2013.01); *G06F 3/0689* (2013.01)

(58) Field of Classification Search
CPC .... G06F 11/1088; G06F 11/1092; G06F 3/04; G06F 3/0619; G06F 3/064; G06F 3/0689
See application file for complete search history.

(56) References Cited

U.S. PATENT DOCUMENTS

| | | | | |
|---|---|---|---|---|
| 5,805,788 A * | 9/1998 | Johnson | ............... | G06F 11/1076 711/114 |
| 7,200,716 B1 * | 4/2007 | Aiello | ................... | G06F 3/0607 709/226 |
| 7,546,483 B1 * | 6/2009 | Overby | ............... | G06F 11/1076 711/114 |
| 7,640,484 B2 | 12/2009 | Corbett et al. | | |
| 7,979,779 B1 * | 7/2011 | Goel | .................... | G06F 11/1076 714/770 |
| 8,086,911 B1 * | 12/2011 | Taylor | ................... | G06F 11/106 711/114 |
| 8,782,292 B2 * | 7/2014 | Madhusudana | ....... | G06F 3/0605 710/11 |
| 8,880,981 B2 * | 11/2014 | Grcanac | ............. | G06F 11/1088 714/6.2 |
| 2012/0166909 A1 * | 6/2012 | Schmisseur | ......... | G06F 11/1076 714/758 |

* cited by examiner

*Primary Examiner* — Marc Duncan
(74) *Attorney, Agent, or Firm* — Klein, O'Neill & Singh, LLP

(57) ABSTRACT

Methods and systems for a storage environment are provided. For example, one method includes receiving a request from a storage server at an offload engine for reconstructing data lost due to a failed storage device of a parity group having a plurality of storage devices; retrieving data and parity by the offload engine from the parity group storage devices that are operational; determining by the offload engine XOR of the retrieved data and parity; presenting XOR of data and parity by the offload engine to the storage server with context information associated with the retrieved data; and reconstructing lost data by the storage server using the XOR of data and parity and the context information provided by the offload engine.

20 Claims, 13 Drawing Sheets

{XR=True, P=3}

| D0 | D1 | D2 | D3 | D4 | D5 | RP | Row-XOR |
|----|----|----|----|----|----|----|---------|
| 0 | 0 | 0 |  | 0 | 0 | 0 | 0 |
| 1 | 1 | 1 |  | 1 | 1 | 1 | 1 |
| 2 | 2 | 2 |  | 2 | 2 | 2 | 2 |
| 3 | 3 | 3 |  | 3 | 3 | 3 | 3 |
| 4 | 4 | 4 |  | 4 | 4 | 4 | 4 |
| 5 | 5 | 5 |  | 5 | 5 | 5 | 5 |

126A

Row-XOR[i] = D0[i] (+) D1[i] (+) D2[i] (+) D4[i] (+) D5[i] (+) RP[i]
where (+) is bit-wise XOR

| D0 | D1 | D2 | D3 | D4 | D5 | RP |
|----|----|----|----|----|----|----|
| 0 | 0 | 0 | 0 | 0 | 0 | 0 |
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| 4 | 4 | 4 | 4 | 4 | 4 | 4 |
| 5 | 5 | 5 | 5 | 5 | 5 | 5 |

126

RP[i] = Row Parity[i] = D0[i] (+) D1[i] (+) D2[i] (+) D3[i] (+) D4[i] (+) D5[i]

FIG. 1C

Diag Parity Set
130A

130B

Diagonal Parity Set Assignments in 8 Disk RDP Array, p = row count = 6
*The parity set membership of row(j) on disk (i) = (i+j) mod (p+1)*
*(where the row parity disk RP is treated as disk 6,*
*and the diagonal parity disk DP is treated as disk 7)*

130

DP[3] = Diagonal Parity[3] = D0[3] (+) D1[3] (+) D2[3] (+) D3[3] (+) D5[3] (+) RP[3]
…

FIG. 1E

Anti-Diagonal Parity Set Assignments in 8 Disk RDP Array, p = row count = 6

*The parity set membership of row(j) on disk (i) = (i+p-j) mod (p+1)*
*(where the row parity disk RP is treated as disk 6,*
*and the anti-diagonal parity disk AD is treated as disk 7)*

AD[3] = Anti-Diagonal Parity[3] = D0[3] (+) D1[3] (+) D2[3] (+) D4[3] (+) D5[3] (+) RP[3]

METHODS AND SYSTEMS FOR OFFLOADING RAID PARITY RECONSTRUCTION

TECHNICAL FIELD

The present disclosure relates to networked storage environments and more particularly, offloading RAID parity XOR determinations for data reconstruction.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices operating in an array of a storage sub-system. The storage devices (may also be referred to as "disks" within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

A storage device may fail in a storage sub-system. Data can be lost when one or more storage devices fail, making it impossible to recover data from the device. One option to avoid loss of data involves parity protection. Parity protection is used to protect against loss of data on a storage device. A parity value may be computed by summing (usually modulo 2) data of a particular word size (usually one bit) across a number of similar disks holding different data and then storing the results on an additional similar disk. That is, parity may be computed on vectors 1-bit wide, composed or bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typical storage devices in a RAID configuration are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripe, with each stripe containing one block from each disk. The blocks or a stripe are usually at the same locations on each disk in the parity group. Within a stripe, all but one block are blocks containing data ("data blocks") and one block is a block containing parity ("parity block") computed by the XOR of all the data.

To reconstruct data, requires determining XOR values. This process is resource and processor intensive. In conventional systems, typically, a storage server executing the storage operating system performs the XOR calculations. The storage operating system of a storage server is involved in various computing tasks and the XOR determination is one task that can use a lot of resources of the storage server. It is desirable to offload some of the reconstruction processes, for example, XOR calculations to other systems.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIG. 1C shows an example of storing row parity and generating missing data;

FIG. 1E shows an example of diagonal parity;

FIG. 1H shows an example of anti-diagonal parity;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, methods and systems for a storage environment are provided. One method includes receiving a request from a storage server at an offload engine (or storage concentrator) for reconstructing data lost due to a failed storage device of a parity group having a plurality of storage devices; retrieving data and parity by the offload engine from the parity group storage devices that are operational; determining by the offload engine XOR of the retrieved data and parity; presenting XOR of data and parity by the offload engine to the storage server with context information associated with the retrieved data; and reconstructing lost data by the storage server using the XOR of data and parity and the context information provided by the offload engine.

Figure 1A:
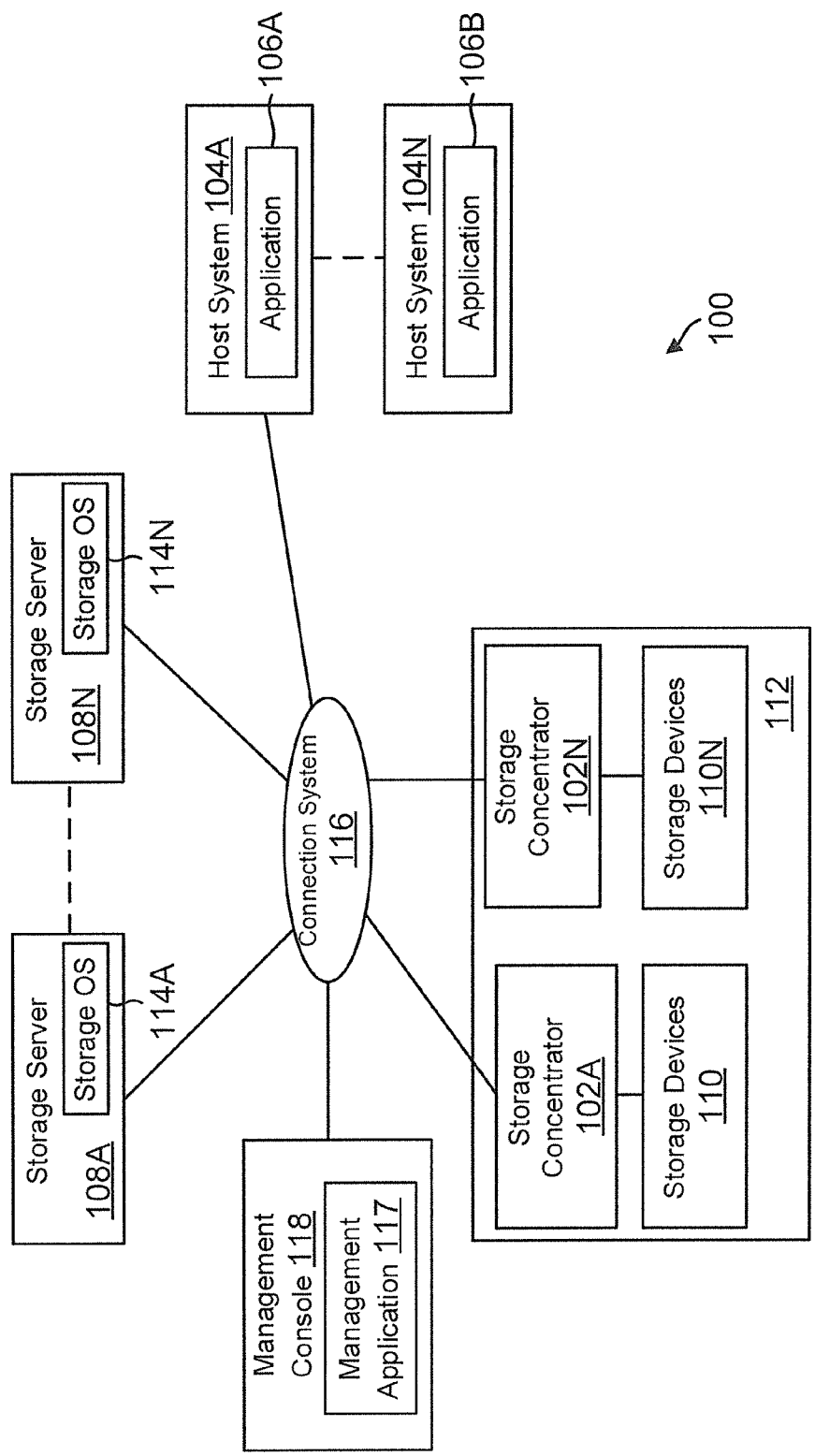
FIG. 1A shows an example of an operating environment for the various aspects disclosed herein.

System 100: FIG. 1A shows an example of a networked operating environment 100 (also referred to as system 100) used according to one aspect of the present disclosure. As an example, system 100 may include a plurality of computing systems 104A-104N (may also be referred to and shown as server system 104 or as host system 104) that may access storage space provided by a storage-subsystem 112 via a connection system (may also be referred to as a fabric) 116 such as a local area network (LAN), wide area network (WAN), the Internet and others. The server systems may be referred to as initiators. The storage-subsystem includes a plurality of storage concentrators 102A-102N (may be referred to as storage concentrator/storage concentrators 102) that manage storage space at storage devices 110A-110N (referred to as storage device/storage devices/disk/disks 102) described below in detail. The storage sub-system or a portion thereof may be uniquely identified and referred to as a target system. The server systems 104 may communicate with each other via connection system 116 (may also be referred to as a fabric), for example, for working collectively to provide data-access service to user consoles (not shown).

Server systems 104 may be computing devices configured to execute applications 106A-106N (may be referred to as application or applications 106) over a variety of operating systems, including the UNIX® and Microsoft Windows® operating systems. Applications 106A-106N (referred to as application 106) may utilize storage devices 110 to storage and access data. Application 106 may include an email exchange application, a database application or any other type of application. In another aspect, application 106 may comprise a virtual machine.

Server systems 104 generally utilize file-based access protocols when accessing information (in the form of files and directories) over a network attached storage (NAS)-based network. Alternatively, server systems 104 may use block-based access protocols, for example but not limited to, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment, according to one aspect. In the virtual machine environment a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, system 100 includes a plurality of storage servers 108A-108N (may be referred to as storage server or storage servers 108 or storage controller 108) that each executes a storage operating system 114A-114N (referred to as storage operating system 114). The storage server 108 access the mass storage devices 110 within the storage subsystem 112 via storage concentrators 102. The storage server 108 or an adapter used by the storage server 108 may also be referred to as initiators that initiate I/O requests for reading or writing data using the storage sub-system 102.

The storage devices 110 may include writable storage device media such as magnetic disks, video tape, optical, DVD, magnetic tape, non-volatile memory devices for example, self-encrypting drives, flash memory devices, solid state storage devices (SSDs) and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, the storage operating system 114 "virtualizes" the storage space provided by storage devices 110. The storage server 108 can present or export data stored at storage devices 110 to server systems 104 as a storage volume or one or more qtree sub-volume units. Each storage volume may be configured to store data files (or data containers or data objects), scripts, word processing documents, executable programs, and any other type of structured or unstructured data. From the perspective of the server systems, each volume can appear to be a single drive. However, each volume can represent the storage space in one storage device, an aggregate of some or all of the storage space in multiple storage devices, a RAID group, or any other suitable set of storage space.

It is noteworthy that the term "disk" as used herein is intended to mean any storage device/space and not to limit the adaptive aspects to any particular type of storage device, for example, hard disks.

The storage server 108 may be used to access information to and from storage devices 112 based on a request generated by server system 104, a management console (or system) 118 or any other entity. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 transmits one or more input/output (I/O) commands, such as an NFS or CIFS request, over connection system 116 to the storage server 108. The storage operating system 114 generates operations to load (retrieve) the requested data from storage devices 110 if it is not resident "in-core," i.e., at the memory of the storage server. If the information is not in the memory, the storage operating system indexes retrieves a logical volume block number (VBN) that is mapped to a disk identifier and disk block number (disk,dbn). The dbn is accessed from a storage device and loaded in memory for processing by the storage server. Storage server 108 then issues an NFS or CIFS response containing the requested data over the connection system 116 to the respective server system 104.

In one aspect, storage server 108 may have a distributed architecture, for example, a cluster based system that may include a separate network module and storage module. Briefly, the network module is used to communicate with host platform server system 104 and management console 118, while the storage module is used to communicate with the storage subsystem 112 (i.e. storage concentrators 102).

The management console 118 is used for managing and configuring various elements of system 100, including the storage concentrators 102. Management console 118 may include one or more computing systems for performing various tasks described below in detail.

In one aspect, as described below in detail, if one or more storage devices fail, the storage concentrator 102 operates as an offload engine to return context information to the storage server 108 in a consolidated manner and not XORed. The storage concentrator 102 computes checksums for each disk block and returns it to the storage server 108. The storage concentrator 102 also perform row, diagonal and anti-diagonal XOR computations that are described below in detail. The diagonal and anti-diagonal XOR are used for providing double and triple protection i.e. if 2 or 3 disks fail in an array. Details of triple parity techniques are provided in U.S. Pat. Nos. 7,640,484 and 7,979,779.

Before describing the various adaptive aspects of the present disclosure, the following defines certain terms that are used throughout this description. User data means any host data and or filesystem metadata. Context information means metadata associated with a given block of user data or RAID parity. A data block means a set of bytes with a certain amount of user data (for example, 4 KB) and context information (for example, 64 bytes). A parity block includes a set of bytes with a certain amount of RAID parity (for example, 4 KB) and context information. A disk block is a data block or a parity block. A parity set is a set of parity block and the data blocks which contribute to the parity blocks.

Figure 1B:
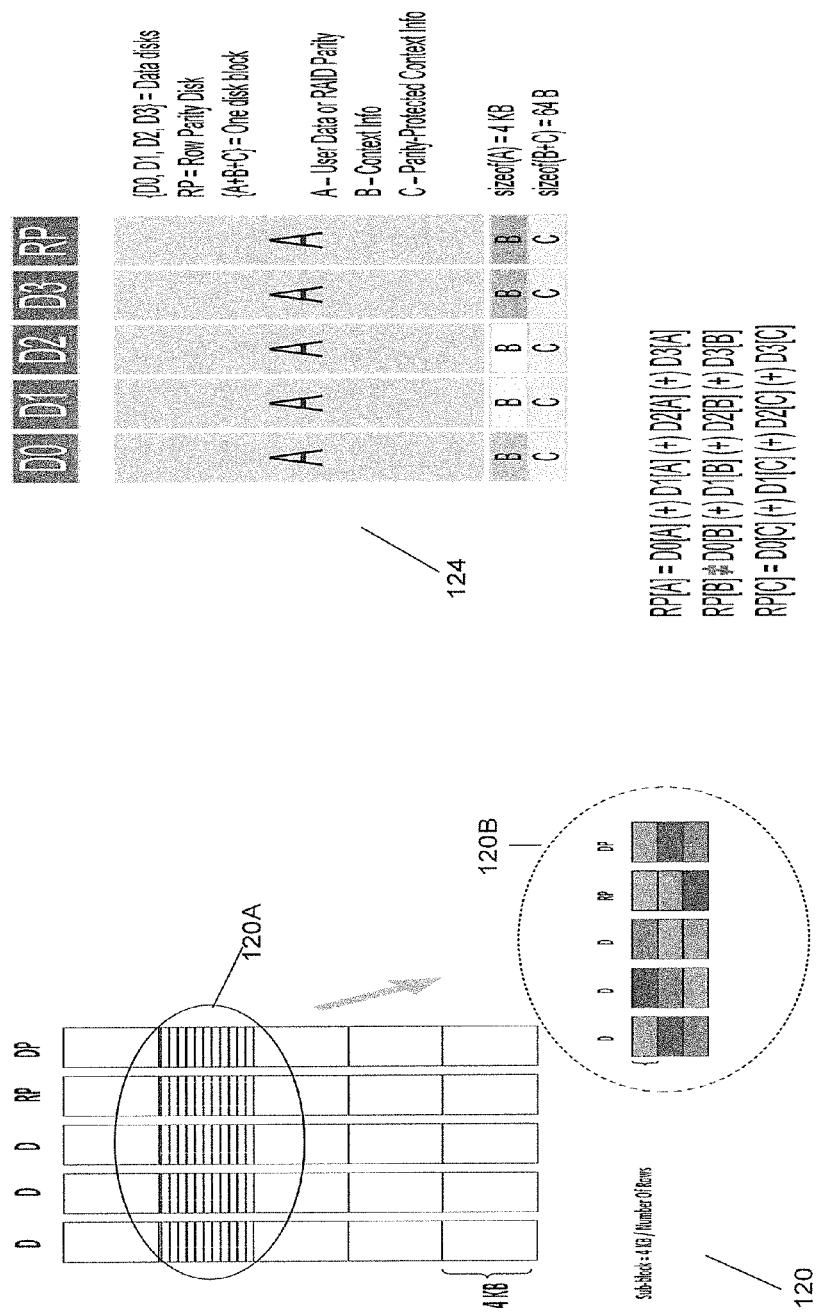
FIG. 1B shows an example of a RAID configuration and how context information is stored.

Array Examples:

FIG. 1B shows an example of an array 120 with data disks labelled as "D", a row parity disk (RP) and a diagonal parity disk (DP). As an example, row 120A includes a plurality of 4 KB block at each disk that form certain number of sub-blocks. The sub-blocks form diagonals and anti-diagonals that are described below in detail. Each parity set may include the same number of rows. The diagonal and anti-diagonal geometry for any storage device is a function of the parity width and disk position within the parity set.

FIG. 1B also shows an example of an array 124 that shows how context information is stored with the user data. The array 124 includes data disks D0-D3 and RAID parity (RP) disk RP. The "A" signifies user data or RAID parity and B is the context information, shown as "context info". As an example, the context information may be the logical block address (LBA) of the disk, a VBN associated with the LBA, a numeric checksum corresponding to A and other information. The context information is used for validating the integrity of the disk blocks by the storage operating system 114. C is the parity protected context information.

The user data A is parity protected, as shown by:
RP[A]=D0[A] (+) D1[A] (+) D2[A] (+) D3[A]; where (+) is bit-wise XOR The context information B is not parity protected as shown by:
RP[B] may or may not be equal to: D0[B] (+) D1[B] (+) D2[B] (+) D3[B]

The parity protected context information is shown:
RP[C]=D0[C] (+) D1[C] (+) D2[C] (+) D3[C]

In one aspect, the context information is treated differently than user data. The context information is not required to be logically contiguous with the associated user data or parity. The storage concentrator 102 operating as an offload engine returns context information to the storage server 108 in a consolidated manner and not XORed.

FIG. 1C shows an example of an array 126 with disks D0, D1, D2, D3, D4, D5 and RP that are used to store user data and a row parity, respectively. The parity for each row at disk RP is based on an XOR value of each row entry, as shown by: RP[i]=Row Parity[i]=D0[i] (+) D1[i] (+) D2[i]+D3[i] (+) D4[i] (+) D5[i]; where (+) is bit-wise exclusive-or If a disk fails, for example, D3 shown as 126A, then the XOR values for the rows is determined by the storage concentrator 102 and provided to the storage server 108. The XOR may be determined by:
Row-XOR[i]=D0[i] (+) D1[i] (+) D2[i] (+) D4[i] (+) D5[i] (+) RP[i]

Figure 1D:
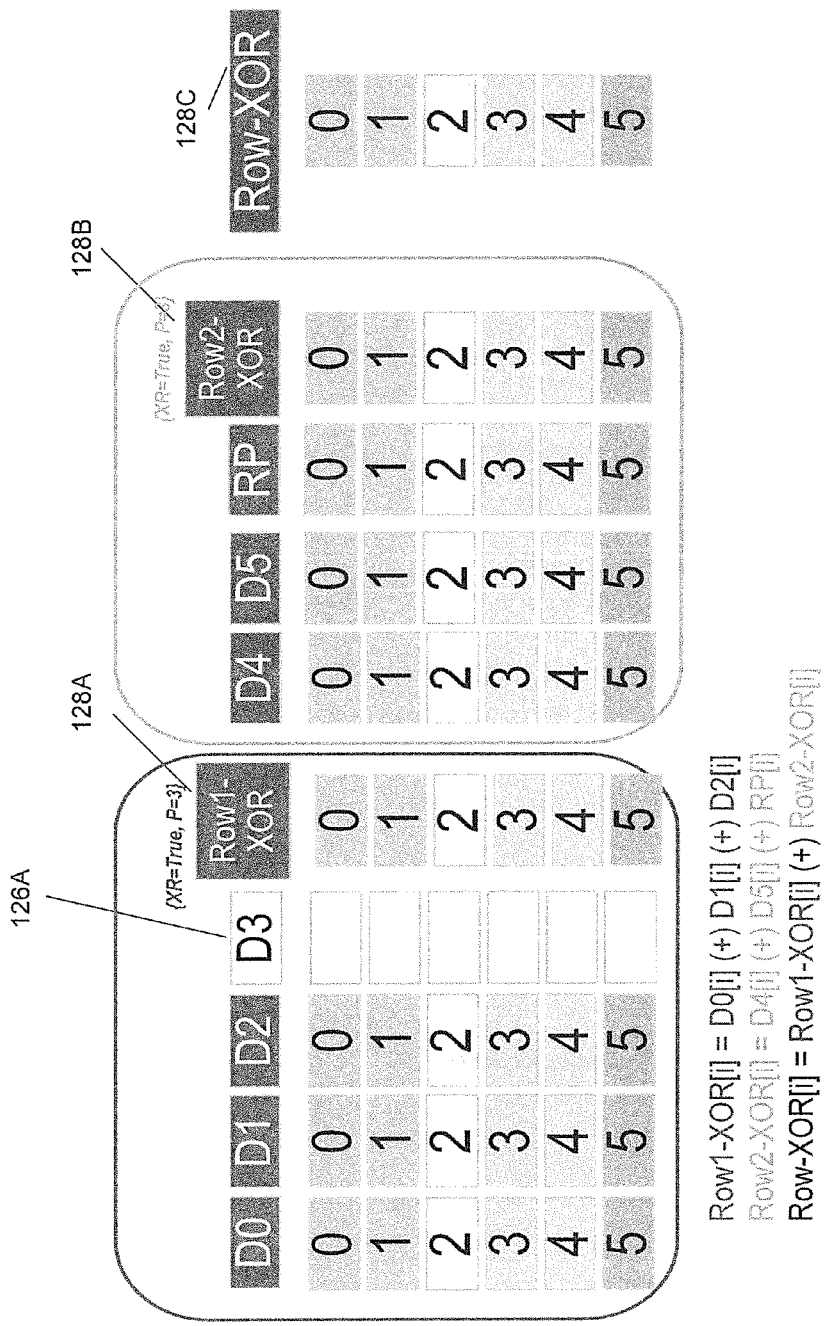
FIG. 1D shows an example of determining missing data using more than one offload engine.

FIG. 1D shows an example of using a plurality of offload engines to determine the XOR of FIG. 1C. A first concentrator determines the first portion (128A) and a second concentrator determines the second portion 128B. The row XOR 128C determination is represented by:
Row1-XOR[i]=D0[i] (+) D1[i] (+) D2[i]
Row2-XOR[i]=D4[i] (+) D5[i] (+) RP[i]
Row-XOR[i]=Row1-XOR[i] (+) Row2-XOR[i]

FIG. 1E shows an example of diagonal parity at array 130. Array 130 includes 6 data disks, one row parity disk (RP) and one diagonal parity disk (DP), where the row parity disk is treated as disk 6 and diagonal parity disk is treated as disk 7. The parity set membership of row(j) on disk (i)=(i+j) mod (p+1).

A diagonal parity set is shown as 130A and 130B. The diagonal parity for set 130A/130B may be determined by:
DP[3]=Diagonal Parity[3]=D0[3] (+) D1[3] (+) D2[3] (+) D3[3] (+) D5[3] (+) RP[3] and so forth.

Figure 1F:
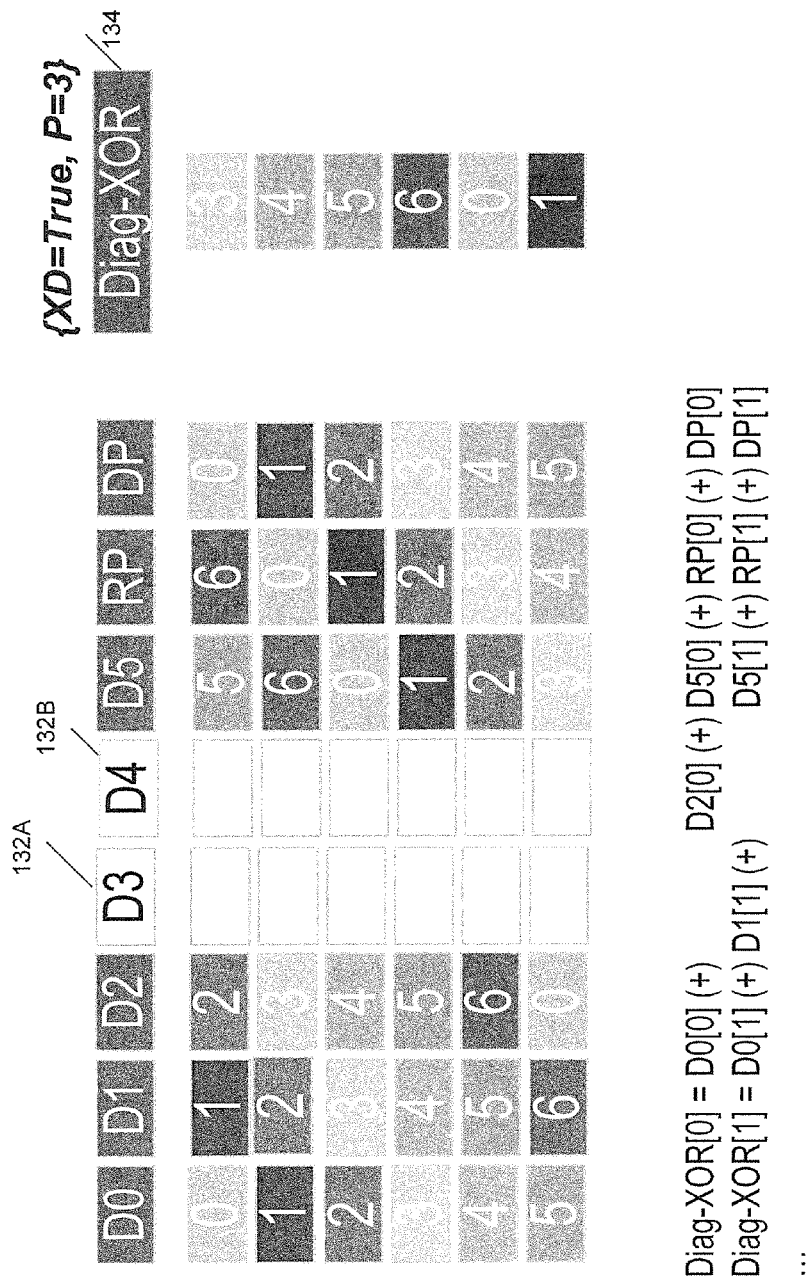
FIG. 1F shows an example of using the diagonal parity of FIG. 1E.
Figure 1G:
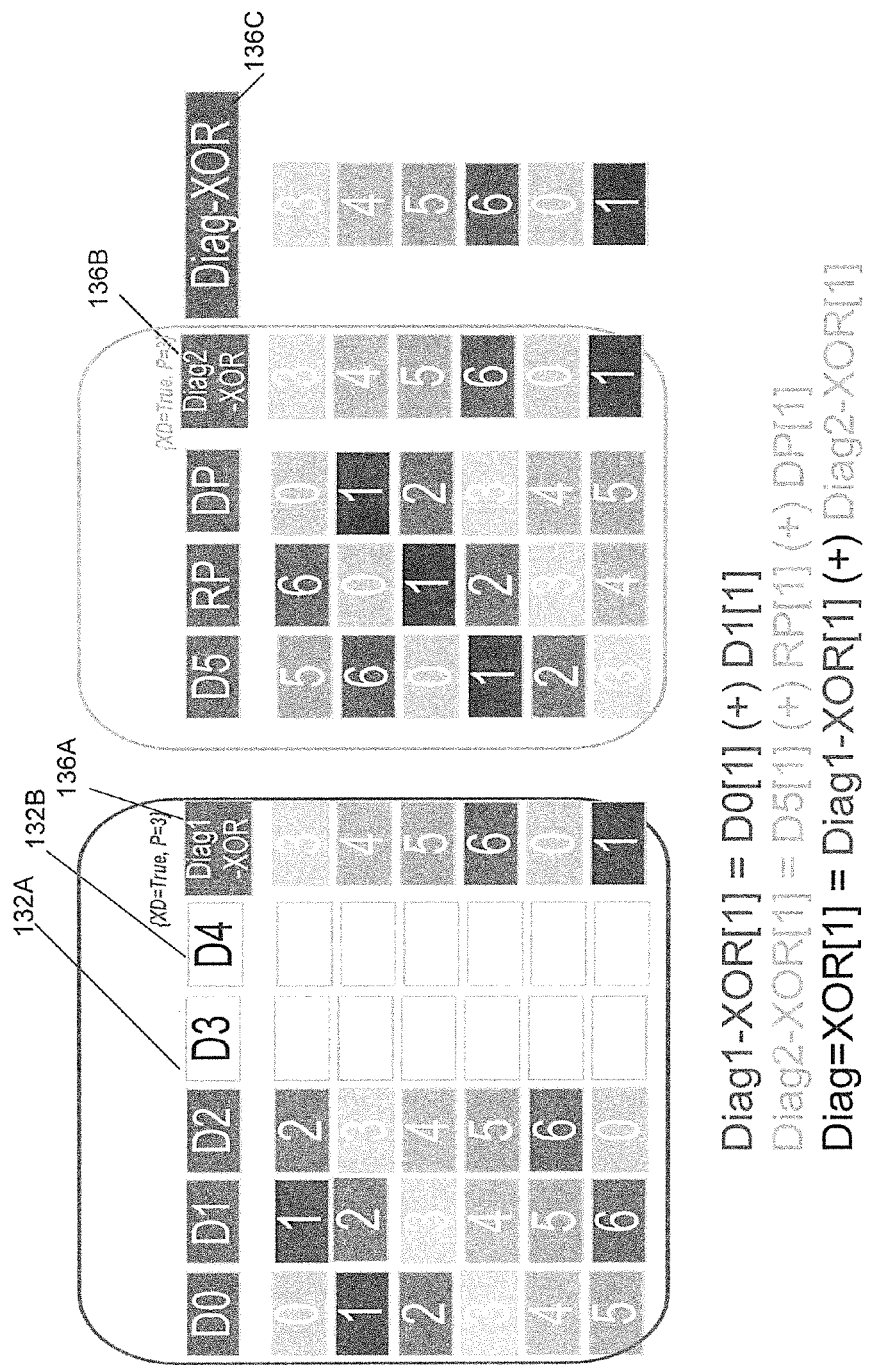
FIG. 1G shows an example of using more than one offload engine for using diagonal parity.

FIG. 1F shows an example of array 130 of FIG. 1E where disks D3 and D4 (labelled as 132A and 132B) have failed. The diagonal XOR is shown as 134 and is determined by:
Diag-XOR[0]=D0[0] (+) D2[0] (+) D5[0] (+) RP[0] (+) DP[0]
Diag-XOR[1]=D0[1] (+) D1[1] (+) D2[1] (+) D5[1] (+) RP[1] (+) DP[1], and so forth, FIG. 1G shows partial diagonal XOR determination by more than one storage concentrator. A first storage concentrator determines the first diagonal XOR 136A based on:
Diag1-XOR[1]=D0[1] (+) D1[1]

A second storage concentrator determines the second portion of the diagonal parity 136B based on:

Diag2-XOR[1]=D5[1] (+) RP[1] (+) DP[1]

Both 136A and 136B are provided to the storage server that can determine the complete XOR based on:

Diag=XOR[1](136C)=Diag1-XOR[1] (+) Diag2-XOR[1]

FIG. 1H shows an example of anti-diagonal parity in an array 138 with 9 disks, as an example. The anti-diagonal parity set is shown as 138A-138C. The anti-diagonal parity for the parity set may be determined by: AD[3]=Anti-Diagonal Parity[3]=D0[3] (+) D1[3] (+) D2[3] (+) D4[3] (+) D5[3] (+) RP[3], and so forth.

Figure 1I:
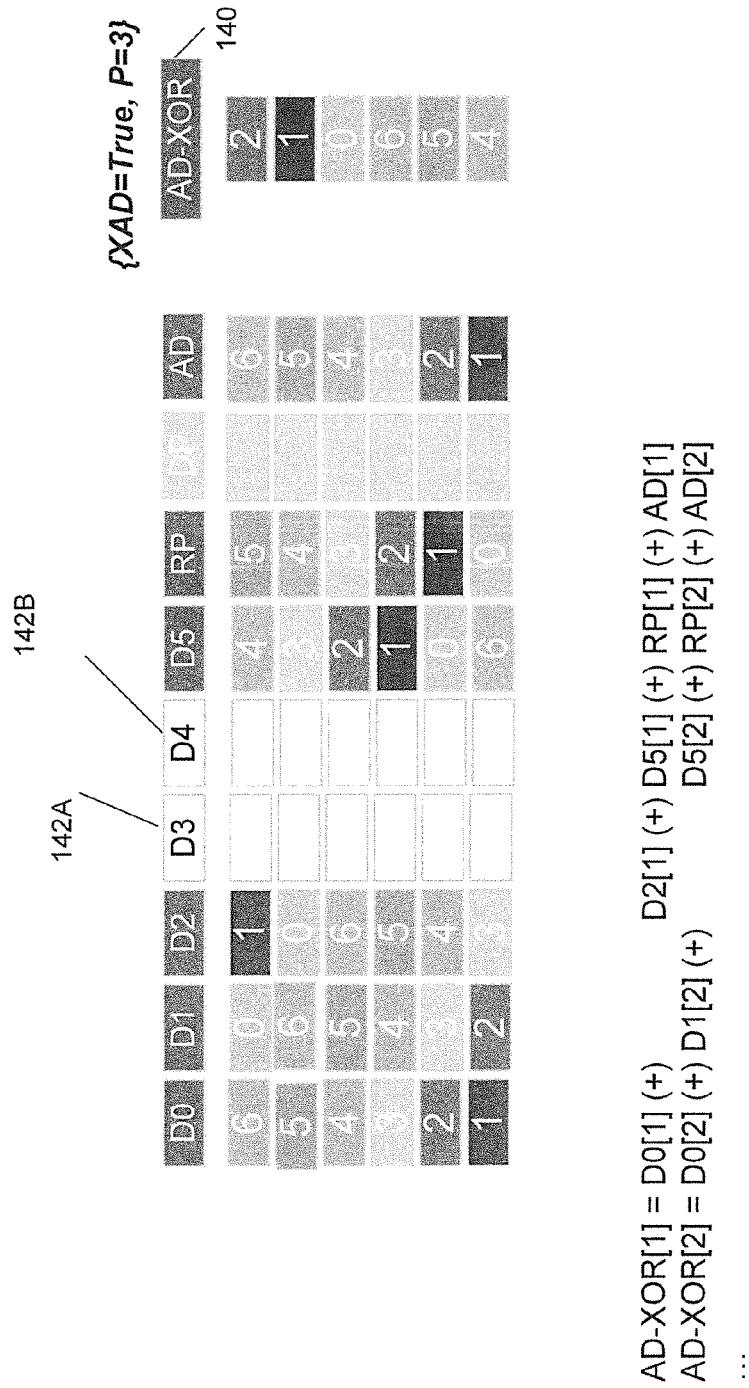
FIG. 1I shows an example of using the anti-diagonal parity of FIG. 1H.

FIG. 1I shows two disks D3 (142A) and D4 (142B) that may have failed. The anti-diagonal parity 140 may be determined by the following XOR operations:

AD-XOR[1]=D0[1] (+) D2[1] (+) D5[1] (+) RP[1] (+) AD[1]

AD-XOR[2]=D0[2] (+) D1[2] (+) D5[2] (+) RP[2] (+) AD[2],and so forth.

Figure 1J:
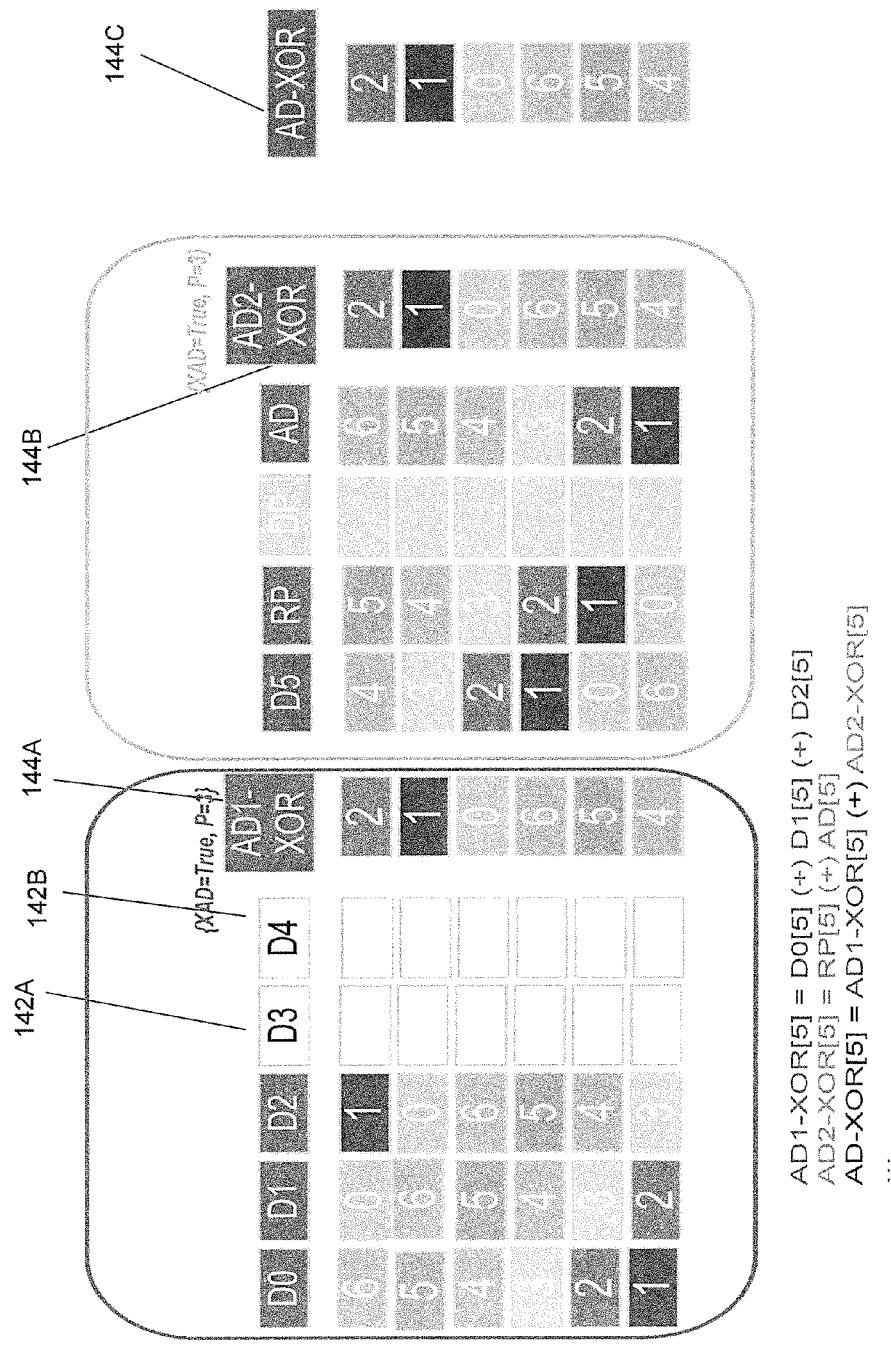
FIG. 1J shows an example of using more than one offload engine for using anti-diagonal parity.

FIG. 1J shows an example of splitting the anti-diagonal XOR calculations between at least two storage concentrator. A first concentrator determines 144A and the second concentrator determines 144B. The two XOR segments are then consolidated by the storage server, shown as 144C. 144A may be determined by:

AD1-XOR[5]=D0[5] (+) D1[5] (+) D2[5] and so forth.

144B may be determined by:

AD2-XOR[5]=RP[5] (+) AD[5] and so forth.

144A and 144B may be consolidated by a storage server 108 to generate 144C shown as: AD-XOR[5]=AD1-XOR[5] (+) AD2-XOR[5] and so forth.

Figure 2A:
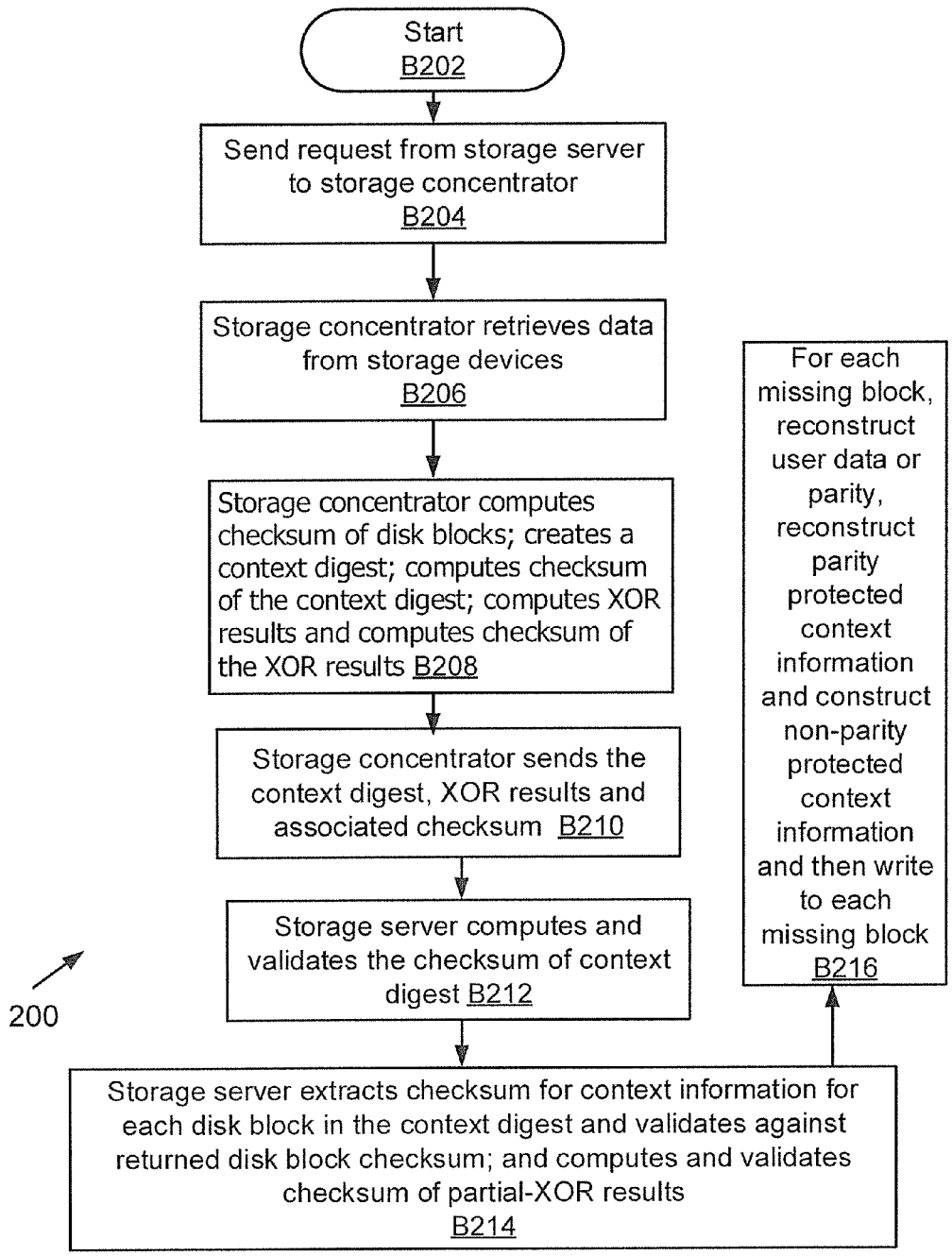
FIGS. 2A-2B show process flows for offloading XOR computations, according to one aspect of the present disclosure.

Process Flow: FIG. 2A shows a process 200 for reconstructing data from one or more failed disks, according to one aspect of the present disclosure. One or more storage concentrators 102 are used for computing the XOR values and managing the context information. The process provides the XOR values and the context information to the storage server 108 so that the lost data can be reconstructed efficiently. The process begins in block B202, when one more disks have failed in an array. Examples of failed disks 126A [FIG. 1C], 132A/132B [FIG. 1F] and 142A/142B [FIG. 1I] have been discussed above with respect to row, diagonal and anti-diagonal parities. Based on a failed disk, the storage server 108 sends a request to one or more storage concentrators 102. Each concentrator is identified by a unique identifier. The storage server identifies a width of a parity set, a number of parity rows per disk block, the number of consecutive disk blocks affected by the failure, a set of source disks, and a set of requested XOR results. For each source disk, a target identifier, DBN, and position within the parity set are identified. For each XOR result, a position within a parity set, row XOR boolean, diagonal XOR boolean, anti-diagonal XOR boolean are identified.

In block B206, the identified storage concentrator 102 reads the identified number of consecutive blocks from each identified disk, starting from the identified DBN.

In block B208, the storage concentrator 102 computes the checksum of the various disk blocks and creates a context digest. The context digest includes context information and the computed disk block checksum values. The storage concentrator 102 also computes the checksum of the context digest. If the disk failure involves row, diagonal and anti-diagonal parity, then the storage concentrator 102 determines the row, diagonal and anti-diagonal XOR. The storage concentrator 102 also computes the checksum of the XOR results. As discussed above, more than one storage concentrator may be used to execute these resource intensive operations.

In block B210, the storage concentrator 102 sends the context digest, XOR results, and the associated checksum values to the storage server 108.

In block B212, the storage server 108 computes and validates the checksum of the context. In block B214, the storage server 108 extracts the checksum for context information for each disk block and validates that against the returned disk block checksum. The storage server 108 also computes and validates the checksum of partial XOR results. Thereafter, in block B216, for each missing block, the storage server 108 reconstructs user data or parity; reconstructs parity protected context information and constructs non-parity protected context information. The missing data can then be written to another disk.

Figure 2B:
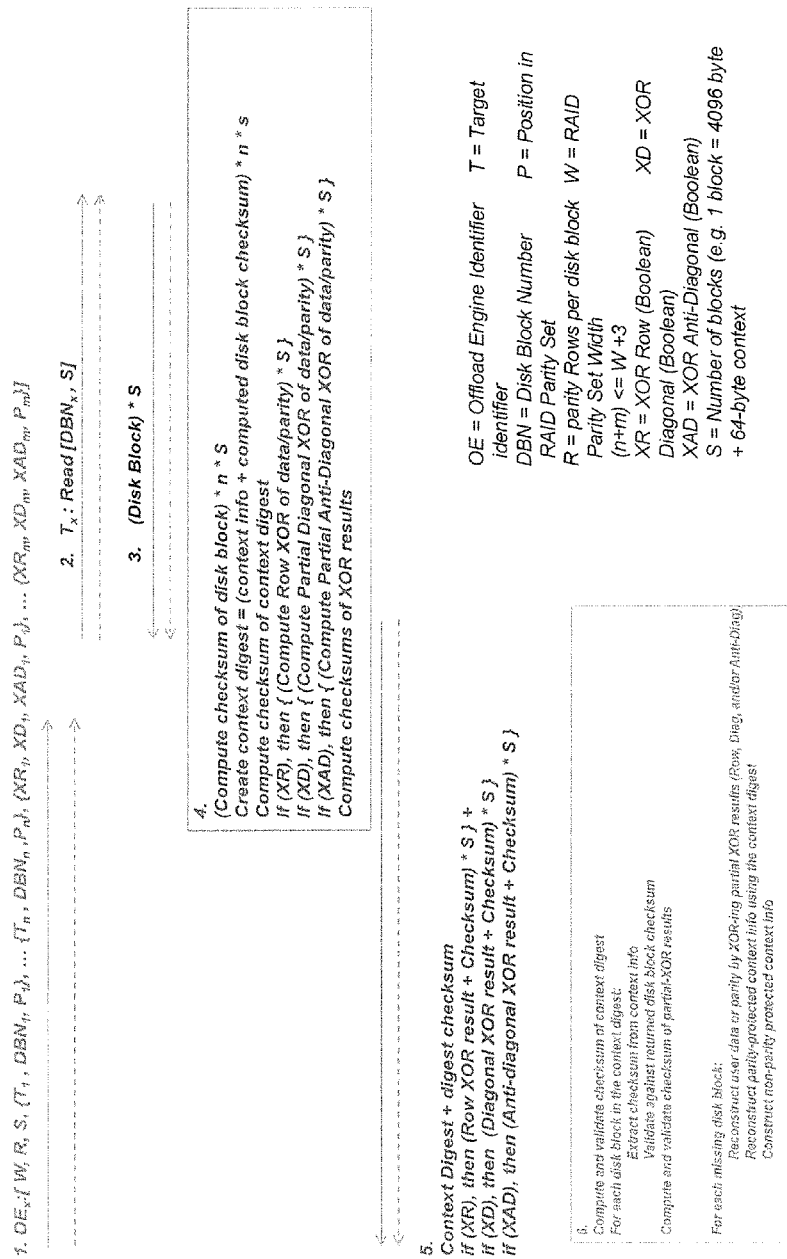

FIG. 2B shows an example of process 200 as process 220. Process step 1 is executed by the storage server 108. Process step 2 shows a request for retrieving data and parity. Step 3 shows receiving the blocks by the storage concentrator 102. Steps 4 and 5 are executed by one or more storage concentrators 102. Steps 6 and 7 are executed by the storage server 108. The details of the process steps are self-explanatory with respect the following key (also shown in FIG. 2B):

OE=Offload Engine Identifier [Storage concentrator identifier]
T=Target identifier
DBN=Disk Block Number
P=Position in RAID Parity Set
R=parity Rows per 4 KB disk block
W=RAID Parity Set Width (n+m)<=W+3
XR=XOR Row (Boolean)
XD=XOR Diagonal (Boolean)
XAD=XOR Anti-Diagonal (Boolean)
S=Number of 4K blocks (e.g. 1 block=4096 byte+64-byte context)

Figure 3:
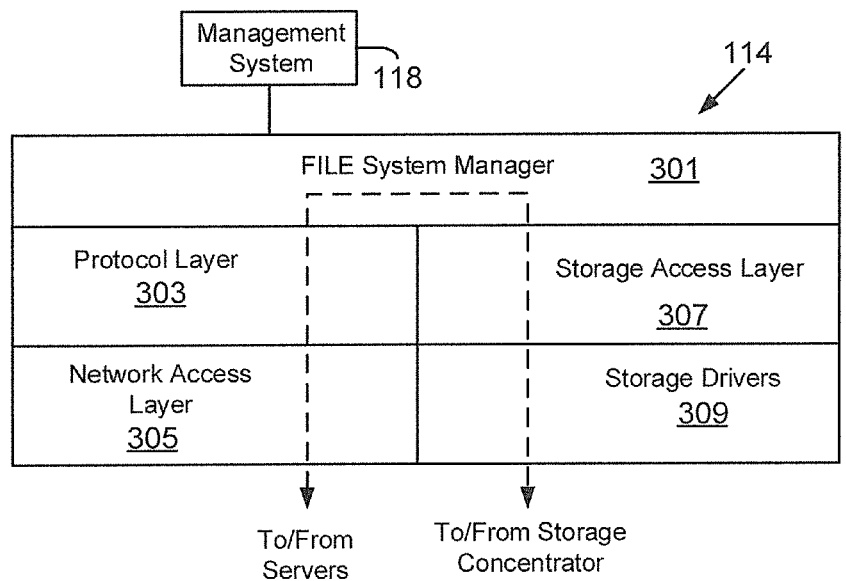
FIG. 3 shows an example of a storage operating system, used according to one aspect of the present disclosure.

Operating System: FIG. 3 illustrates a generic example of operating system 114 executed by storage server 108, according to one aspect of the present disclosure. Storage operating system 114 interfaces with the storage concentrators 102 for reconstructing data when one or more disks fail, described above in detail.

As an example, operating system 114 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 114 may also include a protocol layer 303 and an associated network access layer 305, to allow storage server 108 to communicate over a network with other systems, such as server system 104, concentrators 102 and management console 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and mass storage devices 110 are illustrated schematically as a path, which illustrates the flow of data through operating system 114.

The operating system 114 may also include a storage access layer 307 and an associated storage driver layer 309 to communicate with a storage device. The storage access layer 307 may implement a higher-level disk storage protocol, such as RAID, while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage server 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
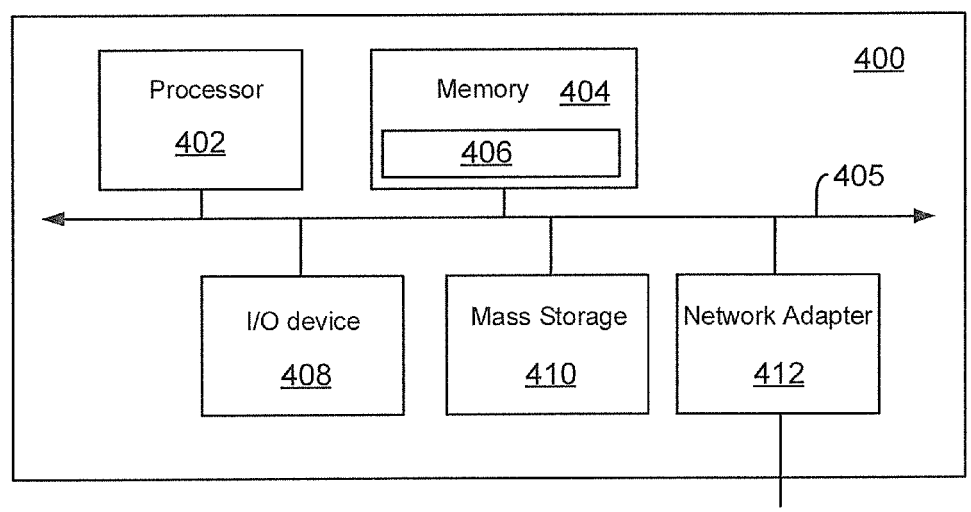
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of the storage concentrator 102, management console 118, server systems 104, storage server 108 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIG. 2A-2B.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for reconstructing data from failed storage devices within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising;
receiving a request from a storage server at an offload engine for reconstructing data lost due to a failed storage device of a parity group having a plurality of storage devices;
retrieving data and parity by the offload engine from the parity group storage devices that are operational;
determining by the offload engine XOR of the retrieved data and parity;
generating a context digest and a checksum of the context digest by the offload engine, wherein the context digest includes a checksum associated with the retrieved data and context information that is metadata associated with the retrieved data including a logical block address and a virtual block number;
presenting XOR of data and parity by the offload engine to the storage server with the context digest, a checksum of XOR results generated by the offload engine and the checksum of the context digest; wherein the context information is provided without being XORed; and
reconstructing lost data including context information associated with the lost data by the storage server using the XOR of data and parity, the context digest and the checksum of the context digest provided by the offload engine.

2. The method of claim 1, wherein the offload engine determines row XOR of data and parity.

3. The method of claim 1, wherein the offload engine determines diagonal XOR of data and parity.

4. The method of claim 1, wherein the offload engine determines anti-diagonal XOR of data and parity.

5. The method of claim 1, wherein more than one offload engine is used to determine the XOR of data and parity.

6. The method of claim 1, wherein the offload engine determines the XOR for more than one failed storage device.

7. The method of claim 1, wherein the storage server computes and validates a checksum of the context information.

8. A non-transitory, machine-readable storage medium having stored thereon instructions for performing a method, comprising machine executable code which when executed by at least one machine, causes the machine to:
   receive a request from a storage server at an offload engine for reconstructing data lost due to a failed storage device of a parity group having a plurality of storage devices;
   retrieve data and parity by the offload engine from the parity group storage devices that are operational;
   determine by the offload engine XOR of the retrieved data and parity;
   generate a context digest and a checksum of the context digest by the offload engine, wherein the context digest includes a checksum associated with the retrieved data and context information that is metadata associated with the retrieved data including a logical block address and a virtual block number;
   present XOR of data and parity by the offload engine to the storage server with the context digest, a checksum of XOR results generated by the offload engine and the checksum of the context digest; wherein the context information is provided without being XORed; and
   reconstruct lost data including context information associated with the lost data by the storage server using the XOR of data and parity, the context digest and the checksum of the context digest provided by the offload engine.

9. The non-transitory, storage medium of claim 8, wherein the offload engine determines row XOR of data and parity.

10. The non-transitory, storage medium of claim 8, wherein the offload engine determines diagonal XOR of data and parity.

11. The non-transitory, storage medium of claim 8, wherein the offload engine determines anti-diagonal XOR of data and parity.

12. The non-transitory, storage medium of claim 8, wherein more than one offload engine is used to determine the XOR of data and parity.

13. The non-transitory, storage medium of claim 8, wherein the offload engine determines the XOR for more than one failed storage device.

14. The non-transitory, storage medium of claim 8, the storage server computes and validates a checksum of the context information.

15. A system, comprising:
   a memory containing machine readable medium comprising machine executable code having stored thereon instructions; and a processor module of an offload engine coupled to the memory, the processor module configured to execute the machine executable code to:
   receive a request from a storage server for reconstructing data lost due to a failed storage device of a parity group having a plurality of storage devices;
   retrieve data and parity from the parity group storage devices that are operational;
   determine XOR of the retrieved data and parity;
   generate a context digest and a checksum of the context digest, wherein the context digest includes a checksum associated with the retrieved data and context information that is metadata associated with the retrieved data including a logical block address and a virtual block number;
   present XOR of data and parity to the storage server with the context digest, a checksum of XOR results generated by the offload engine and the checksum of the context digest; wherein the context information is provided without being XORed; and
   reconstruct lost data including context information associated with the lost data by the storage server using the XOR of data and parity, the context digest and the checksum of the context digest provided by the offload engine.

16. The system of claim 15, wherein the offload engine determines row XOR of data and parity.

17. The system of claim 15, wherein the offload engine determines diagonal XOR of data and parity.

18. The system of claim 15, wherein the offload engine determines anti-diagonal XOR of data and parity.

19. The system of claim 15, wherein more than one offload engine is used to determine the XOR of data and parity.

20. The system of claim 15, the storage server computes and validates a checksum of the context information.

* * * * *